(12) United States Patent
Yamauchi et al.

(10) Patent No.: US 7,678,486 B2
(45) Date of Patent: Mar. 16, 2010

(54) SEPARATOR FOR FUEL CELL AND FUEL CELL CONTAINING THE SEPARATOR

(75) Inventors: Hiroshi Yamauchi, Hitachi (JP); Kenji Yamaga, Hitachi (JP); Ko Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1045 days.

(21) Appl. No.: 11/324,487

(22) Filed: Jan. 4, 2006

(65) Prior Publication Data
US 2006/0147787 A1 Jul. 6, 2006

(30) Foreign Application Priority Data
Jan. 6, 2005 (JP) ............................. 2005-001248

(51) Int. Cl.
*H01M 2/02* (2006.01)
(52) U.S. Cl. ............................. 429/34; 429/38; 429/39
(58) Field of Classification Search .................... 429/34, 429/38, 39, 35, 44
See application file for complete search history.

(56) References Cited
U.S. PATENT DOCUMENTS
2003/0162079 A1* 8/2003 Ooma et al. ................... 429/38
2003/0215679 A1* 11/2003 Reinke et al. ................. 429/13
2004/0110057 A1* 6/2004 Yoshimoto et al. ............ 429/38

FOREIGN PATENT DOCUMENTS
| JP | 2000-123850 | 4/2000 |
| JP | 2000-294257 | 10/2000 |
| JP | 2003-173791 | 6/2003 |

* cited by examiner

*Primary Examiner*—Raymond Alejandro
(74) *Attorney, Agent, or Firm*—Antonelli, Terry, Stout & Kraus, LLP.

(57) ABSTRACT

A separator includes an electrically conductive flat plate and two electrically conductive channel plates superposed on each other with the electrically conductive flat plate interposed therebetween. The separator includes a plurality of manifolds for passing a reaction fluid to an adjacent cell are provided in the electrically conductive flat plate, and a plurality of zigzag or straight through-channels for permitting the flowing of the reaction fluid from the manifolds are formed in each of the two channel plates. The separator includes the through-channels in any one of the two electrically conductive channel plates disposed so that they are partially overlapped with the manifolds in the electrically conductive flat plate, and the through-channels in the other electrically conductive channel plate are formed to be partially larger than the contour of the electrically conductive flat plate.

15 Claims, 13 Drawing Sheets

SEPARATOR FOR FUEL CELL AND FUEL CELL CONTAINING THE SEPARATOR

BACKGROUND OF THE INVENTION

1. Field of the Invention

The present invention relates to a separator, i.e. a Bipolar Plate separator, which is a member of a fuel cell, and a fuel cell using it.

2. Related Art

There are several types of fuel cells, depending on the type of an electrolyte. A phosphoric acid-type fuel cell is of a type using phosphoric acid infiltrated in a support, and is operated at 150 to 220° C. A molten carbonate-type fuel cell is made using a mixture of lithium carbonate and potassium carbonate molded in an electrolyte support, and is operated at 600 to 700° C. A solid oxide-type fuel cell uses stabilized zirconia having an oxygen ion-conducting property as an electrolyte, and is operated at 700 to 1,000° C. In both of the fuel cells, hydrogen, a reformed gas, hydrocarbons or the like is used as fuel, and air is used as an oxidizing gas.

Among various fuel cells, a polymer electrolyte fuel cell (PEFC) and a direct methanol-type fuel cell (DMFC) have a main feature in that a carbon electrode having a catalyst such as platinum carried thereon is bonded to opposite surfaces of a membrane-shaped solid electrolyte formed of a polymer. This assembly is called MEA (a membrane electrode assembly which is also referred to as a membrane/electrode integrated structure). The polymer electrolyte fuel cell assumes a structure called as a separator, in which MEA is clamped between a pair of plates in which channels for a fuel gas (a hydrogen-containing gas) and an oxidizing gas (oxygen or air).

Herein, fuel and an active substance as an oxidizing agent are called collectively a reaction fluid. When each of the fuel and the oxidizing agent is a gas, it called particularly a reaction gas. The following is the description taking, as an example, a case where the fuel and the fluid as the oxidizing agent are gasses.

Usually, MEA and a separator are clamped through a porous carbon sheet. This porous carbon sheet is called a gas diffusion layer and has a function to supply the reaction gas to an electrode with a good efficiency and uniformly. An assembly comprising the MEA, the separator and the gas diffusion layer combined to one another into a set is referred to as a single cell. The fuel cell stack is a structure made by laminating a plurality of simplex cells one on another. The separator has a role to supply the reaction gas to the electrode with a good efficiency, and a power can be taken out by supplying the reaction gas to the fuel cell and applying an appropriate load. This is accompanied by the generation of a heat such as a reaction heat and a joule heat. To remove this heat, usually, the fuel cell is provided with a separator for passing cooling water to a portion of the above-described separator.

The separator has a role to transmit a power to an adjacent cell, while suppressing the loss of energy and hence, is usually formed of a carbon-based conductive material and has through-channels formed therein for passing the reaction gas and a cooling medium. It is also investigated that a thin metal plate is used as a separator material in addition to the carbon-based material. A separator made of a metal has merits that the separator is inexpensive in material cost is low; the separator is easy to form by stamping; and the separator can be made compactly and with a reduced weight, because a thin plate can be used.

In a case of a separator having channels and formed by pressing of a thin metal plate, the processability or workability is restricted to a limit of the processability of a metal material and for this reason, it is difficult to form a channel having a desired depth and a desired width by processing. This causes evil influences that the uniformity of the flowing of the reaction gas is not obtained and that a sufficient area of contact with the electrode cannot be provided, and as a result, it is difficult to provide a desired power-generating performance. Even if the formation of a desired groove by processing is possible, a warpage or a strain may be generated in the separator produced after the processing, and a required finishing accuracy may be not provided in some cases, thereby bringing about the leakage of the reaction gas and an increase in contact resistance.

Another drawback of the separator formed by the pressing of the metal is a problem that each of apexes produced after the formation of the grooves has a curvature, and in a case of an integrated MEA comprising a gas diffusion layer and MEA formed integrally with each other, an area of contact with the integrated MEA is smaller and as a result, the resistance is increased, and a good power-generation performance cannot be obtained. To solve this problem, it is a conventional practice to remove the apex portions having the curvature to flatten the separator (for example, see JP-A-2003-173791).

It is also a conventional practice to form a single separator by a thin metal plate and a carbon paper cut into a channel-defining configuration without carrying out the pressing (for example, see JP-A-2000-123850 and JP-A-2000-294257). The separator of this structure can be produced at a reduced cost. In addition, the channels are created by cutting the carbon paper and hence, the finishing accuracy is higher. Further, the surface of contact of the gas diffusion layer is flat and hence, there is not a problem as arisen in the case of the separator produced by the pressing of the metal.

Besides, in general, the fuel cell generates heat with the generation of a power. Usually, it is required in the fuel cell that cooling water is passed to a cooling cell mounted within the cell to remove a heat and is subjected to the heat exchange. It has been also designed that an oxidizing gas itself is used as a cooling medium in some of molten carbonate-type fuel cells. In the solid polymer electrolyte fuel cell, however, it is not that the cooling by the gas medium is carried out in the majority of cases, for a reason that the temperature of the cell is lower, for a reason that an auxiliary power as small as possible is demanded from the viewpoint of increasing the power-generating efficiency, and for another reason. If the cooling efficiency of the fuel cell is improved, the need for use of a cooling cell, a cooling water pump, a heat exchanger and the like is eliminated and consequently, the simplification of the system is realized.

The separator formed from the thin metal plate and the carbon paper cut into the channel-defining configuration as the gas channel member has many advantages. However, the carbon paper defining the channels is divided into a large number of pieces and hence, a plurality of channel members subdivided in accordance with an increase in number of channels are required. As a result, the following problem is arisen: The number of parts for constituting the cell is increased, and these parts are bound together by a conductive material, resulting in an increase in number of manufacturing steps. In the inventions described in JP-A-2000-123850 and JP-A-2000-294257, it is also a subject to be solved that the prevention of the metal corrosion occurring on the surface of the metallic separator which is in contact with the channel portions is not taken into consideration. In an environment of the cell, the metallic portion is corroded, or a non-conductive passivation film is grown on the metallic portion. As a result, the deterioration of the fuel cell might occur due to an increase in contact resistance, the pollution of the electrodes and the electrolyte membrane by a corrosion product and the like. In addition, no attention is especially paid to the cooling of the body of the fuel cell in all of the above-described patent documents.

It is an object of the present invention to provide a separator which can be produced using a reduced number of parts as compared with the prior art using a carbon paper cut into a channel-defining configuration and which has a higher cooling effect, and a fuel cell including such separator.

SUMMARY OF THE INVENTION

The present invention resides in a separator for a fuel cell, which includes an electrically conductive flat plate and two electrically conductive channel plates superposed on each other with the electrically conductive flat plate interposed therebetween, wherein a plurality of manifolds for passing a reaction fluid to the adjacent cell are formed in the electrically conductive flat plate; through-channels for permitting the flowing of the reaction fluid from the manifolds are formed in the two electrically conductive channel plate; any one of said two electrically conductive channel plate is disposed so that a portion of each of the through-channels is overlapped with each of the manifolds in the electrically conductive flat plate; and the through-channels in the other electrically conductive channel plate extend as far as outside the electrically conductive flat plate.

The present invention also resides in a fuel cell including the above-described separator.

Further, the present invention provides a fuel cell comprising a fuel cell stack constructed by laminating power-generating units which includes an electrolyte/electrode integrated structure formed of an electrolyte and electrodes integrated together, a pair of gas diffusion layers disposed on opposite surfaces of the electrolyte/electrode integrated structure, and a pair of separators disposed outside the gas diffusion layers; electric collector plates disposed outside the fuel cell stack; and end plates disposed outside the electric collector plates, wherein a separator as described in the just-described paragraph is mounted as each of the separators of the power-generating unit.

The separator according to the present invention is constructed by laminating the pair of electrically conductive channel plates outside the electrically conductive flat plate formed of a flat metal plate or the like and hence, is also referred to as a laminated-type separator.

The separator according to the present invention is comprised of the single electrically conductive flat plate and the two electrically conductive channel plates and hence, has a reduced number of parts and is easy to form by processing and to assemble, as compared with the separator formed using the carbon paper cut into the channel-defining configuration in the prior art. In addition, the through-channels in one of the electrically conductive channel plate are larger than the contour of the electrically conductive flat plate, leading to a higher cooling effect.

According to the present invention, the separator is constructed by the single electrically conductive flat plate and the two flat plate-shaped electrically conductive channel plates. Because the plate remains in the flat plate-shape, the contact area can be provided at a larger value, and the area of contact with the other member, e.g., the gas diffusion layer or the integrated MEA can be also provided at a larger value. Therefore, there is an effect that the resistance causing an energy loss can be decreased. There is also an effect that the separator-constituting members can be prepared simply through a drilling and are easy to process and assemble.

In the separator according to the present invention, the electrically conductive flat plate centrally disposed can be made of a metal, and a coating layer for preventing the corrosion of the electrically conductive flat plate or suppressing the growth of a passivation film can be provided on the whole of the surface of the electrically conductive flat plate or at least on an area of the surface of the electrically conductive flat plate, which is in contact with the through-channels. This can solve the problem of the corrosion which is a subject peculiar to the metal separator.

Each of the electrically conductive channel plates disposed on opposite sides of the electrically conductive flat plate can be formed of a porous material. The amount of gas supplied to the electrode through the channel plates is increased by forming the channel plate of the porous material and hence, the power-generating voltage and the diffusion-limited current can be increased.

Additionally, slits can be provided in the electrically conductive flat plate. In this case, the positions of the slits provided are determined so that the through-channels in the two channel plates are overlapped with each other when the two channel plates contacting with the opposite surfaces of the electrically conductive flat plate are projected. By provision of the slits at such positions, it is possible to provide a structure in which the channel plates disposed on the opposite sides of the electrically conductive flat plate are in direct electrical contact with each other, so that no metallic portion is present in a path for passage of electric current. This makes it possible to suppress the growth of the passivation film or the increase in contact resistance due to the corrosion, which is the subject in the metal separator.

The electrically conductive flat plate having the corrosion-preventing coating layer and the channel plates may be formed integrally with one another, whereby the handleability of the separator can be improved.

In the separator according to the present invention, an outermost layer can be formed of a metal selected from the group consisting of a stainless steel, nickel, a nickel-based alloy, titanium, a titanium-based alloy, niobium, a niobium-based alloy, tantalum, a tantalum-based alloy, tungsten, a tungsten-based alloy, zirconium and a zirconium-based alloy, aluminum and an aluminum-based alloy, whereby the corrosion resistance can be enhanced.

The coating layer covering the surface of the electrically conductive flat plate can be formed from a binder containing a resin selected from a fluorine-based resin, a phenol-based resin, an epoxy-based resin, a styrene-based resin, a butadiene-based resin, a polycarbonate-based resin, a polyphenylene sulfide-based resin, or a mixture or a copolymer of two or more of them, and one or more types of carbon-containing conductive materials.

In one embodiment of the present invention, a separator having a longer life can be provided at a lower cost by combination of a flat plate-shaped metallic plate provided with a corrosion-preventing coating layer and electrically conductive channel plate. One separator can be formed by clamping a flat plate-shaped coated metal plate between two channel plates having a plurality of punched zigzag or straight channels for permitting the flowing of the reaction gas. One of the two electrically conductive channel plates is disposed so that a portion of each of the through-channels is overlapped with each of the manifolds in the electrically conductive flat plate, and the through-channels in the other electrically conductive channel plate exists as far as outside the coated metal plate. All of the separator having this structure can be formed by a punching process and hence, it is possible to reduce the cost and to ensure a sufficient contact area. Various tests regarding the life of the separator have been carried out and as a result, it has been made clear that the metallic portion corroded is observed remarkably at a portion through which electric current is passed. For this reason, in the present embodiment, the coating layer for suppressing the corrosion or the like is provided on the surface of the electrically conductive flat plate which is a metallic substrate. This means makes it possible to substantially extend the life of the separator.

By the fact that the through-channels in one of the channel plates are partially larger than the coated metallic plate, a rugged portion is formed, and serves as a fin, when a cell is produced by laminating the separator onto another member such as an electrolyte membrane. An outlet and an inlet are formed on adjoining faces of recesses and projections and hence, the reaction fluid is passed through the rugged fin. A cooling effect and the simplification of the cell structure are realized by the fact that the heat-transferring area is increased and the reaction fluid itself is a cooling medium.

In the separator according to the present invention, it is desirable that the channel plate, to the through-channels of which the fuel as the reaction fluid is supplied, is formed so that the through-channels are formed in a zigzag shape and partially overlapped with the manifolds in the electrically conductive flat plate. In addition, in the channel plate, to the through-channels of which a fluid as an oxidizing agent is supplied, it is desirable that the through-channels are formed in a straight shape and formed longer, so that a portion of each of the straight-shaped through-channels extends as far as outside the electrically conductive flat plate, when the channel plate is superposed onto the electrically conductive flat plate.

Other objects, features and advantages of the invention will become apparent from the following description of the embodiments of the invention taken in conjunction with the accompanying drawings.

DETAILED DESCRIPTION OF PREFERRED EMBODIMENTS

Embodiment 1

Figure 1:
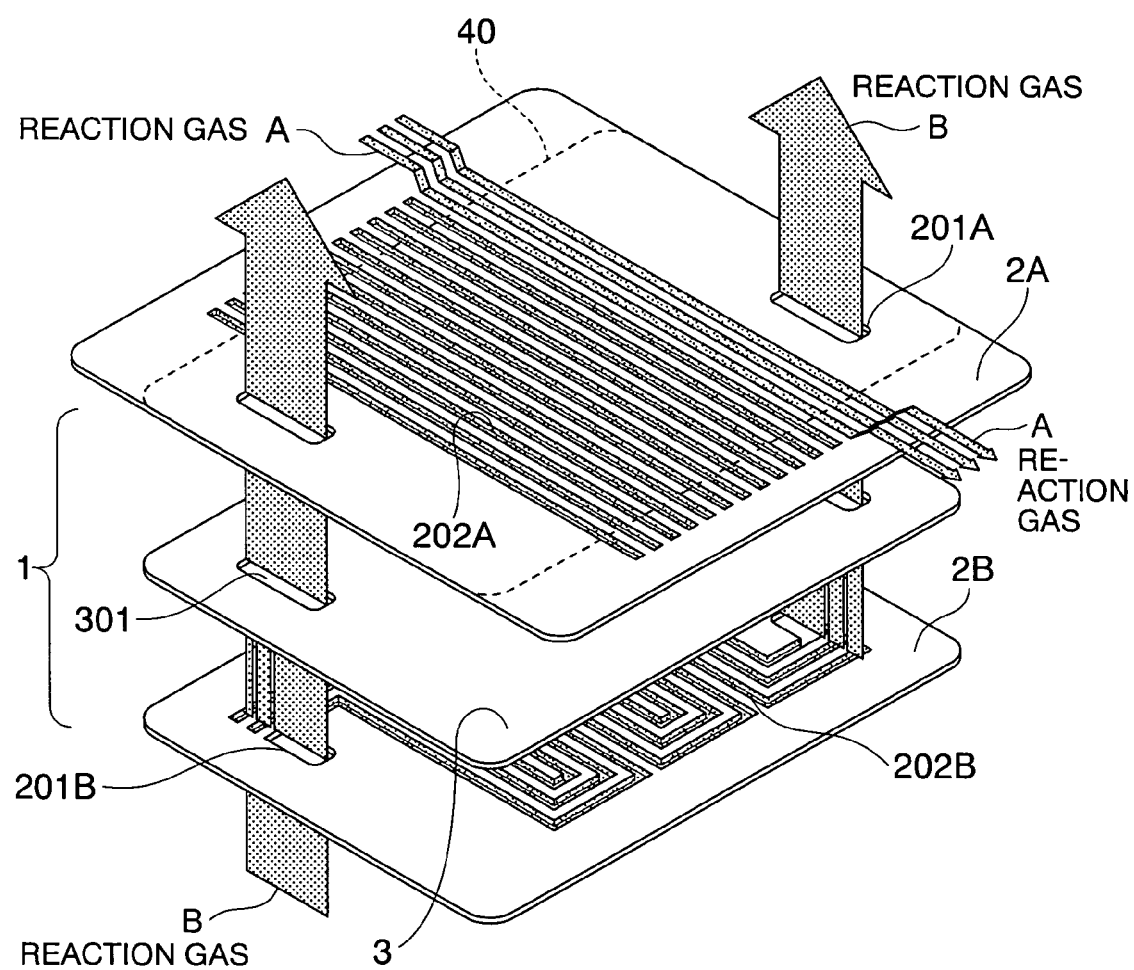
FIG. 1 is a developed perspective view showing the arrangement of a basic separator according to the present invention.

FIG. 1 shows the basic arrangement of a separator according to the present invention. The separator 1 in the present embodiment is comprised of a coated metal plate 3 and electrically conductive channel plates 2A and 2B. The coated metal plate 3 is formed by forming a corrosion-preventing coating layer on a flat plate-shaped metallic substrate. A plurality of manifolds 301 for passing a reaction fluid to an adjacent cell are formed in the coated metal plate. A plurality of serpentined through-channels 202B are provided in the channel plate 2B, and a plurality of manifolds 201B, as required, are formed in the channel plate 2B. A plurality of straight through-channels 202A are provided in the other channel plate 2A, and a plurality of manifolds 201A, as required, are formed in the channel plate 2A. The sizes of the coated metallic plate 3 and the channel plate 2B are equal or substantially equal to each other, but the size of the channel plate 2A is larger than those of the coated metallic plate 3 and the channel plate 2B. A dashed line 40 in FIG. 1 indicates a projection line made by projecting the contours of the coated metallic plate 3 and the channel plate 2B onto the channel plate 2A, and the channel plate 2A is larger than the coated metallic plate 3 and the channel plate 2B by a section protruding outside the projection line. Each of the through-channels 202A is a fine and longer groove formed so that its end reaches the protruding section.

Figure 2A:
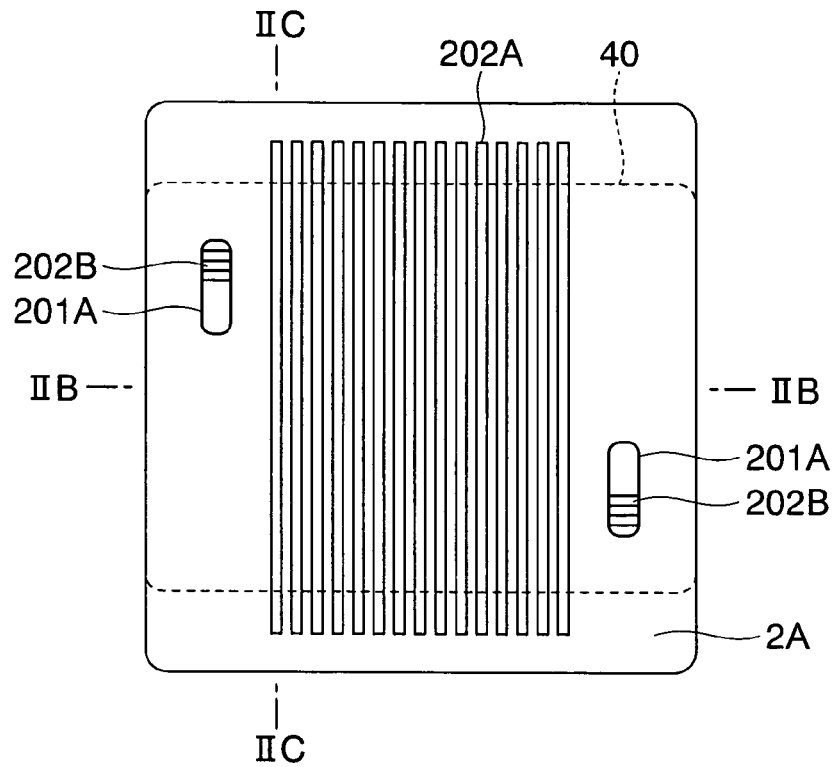
FIG. 2A is a plan view of the separator shown in FIG. 1, when channel plates have been superposed on opposite surfaces of a coated metal plate.
Figure 2B:
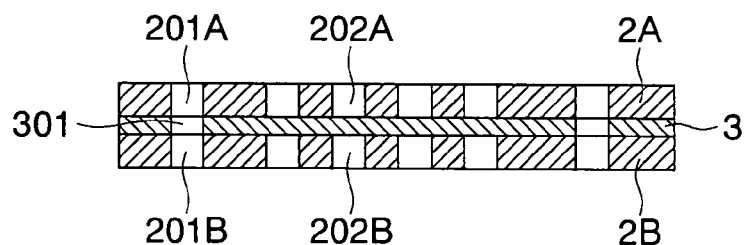
FIGS. 2B and 2C are sectional views of such separator.
Figure 2C:
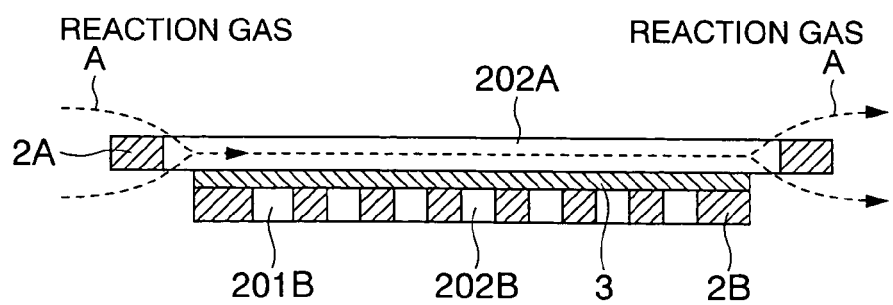

FIGS. 2A, 2B and 2C shows a separator in which channel plates 2A and 2B are vertically superposed on each other, so that a coated metallic plate 3 is sandwiched between both of the channel plates 2A and 2B. FIG. 2A shows the separator viewed from an upper surface of the channel plate 2A; FIG. 2B is a sectional view taken along a line IIB-IIB, and FIG. 2C is a sectional view taken along a line IIC-IIC. The coated metallic plate 3 and the channel plates 2A and 2B are disposed so that respective manifolds communicate with each other. In this case, a portion or the whole of each of the through-channels 202B in the channel plate 2B is provided to overlap the manifold 301.

A reaction gas A and a reaction gas B flow, for example, as illustrated in FIG. 1. The reaction gas B flows via the manifold 201B and the manifold 301 and reaches the manifold 201A. In the manifold 201B, a portion of the reaction gas B is diverted to run in a direction into the surface of the separator 1, and the remaining portion of the reaction gas B runs straightly, because the through-channel 202B is formed through the channel plate 2B. The reaction gas flowing in the direction into the surface runs along a path in the through-channel 202B and reaches the opposite manifold, where it is joined with the flow running straightly.

On the other hand, the reaction gas A flows into and out of the through-channel 202A through a clearance which is created due to that fact that the through-channel 202A is larger than the coated metallic plate 3 and the channel plate 2B, as shown in FIG. 1 and FIG. 2C. Therefore, the reaction gas A flows from and to the outside of the cell. In this case, the reaction gas A flows in contact with the portion of the channel plate 2A protruding outwards and hence, the protruding portion acts as a heat-dissipating plate, leading to an increase in the cooling effect for the cell.

In another respect, the size of the manifold 301 is larger than that of the portion of the through-channel 202B in the channel plate 2B, which is overlapped with the manifold 301, thereby providing a structure in which the reaction gas can be passed through the manifold without a resistance. Thus, it is possible to reduce the loss in pressure of the reaction gas flow and to enhance the efficiency of the cell.

From the foregoing, in any of the channel plates 2A and 2B, a channel portion can be formed by a single plate. In addition, any of the coated metallic plate 3 and the channel plates 2A and 2B can be made by a punching and hence, the cost can be suppressed. The heat-dissipating characteristic can be also enhanced.

Figure 3A:
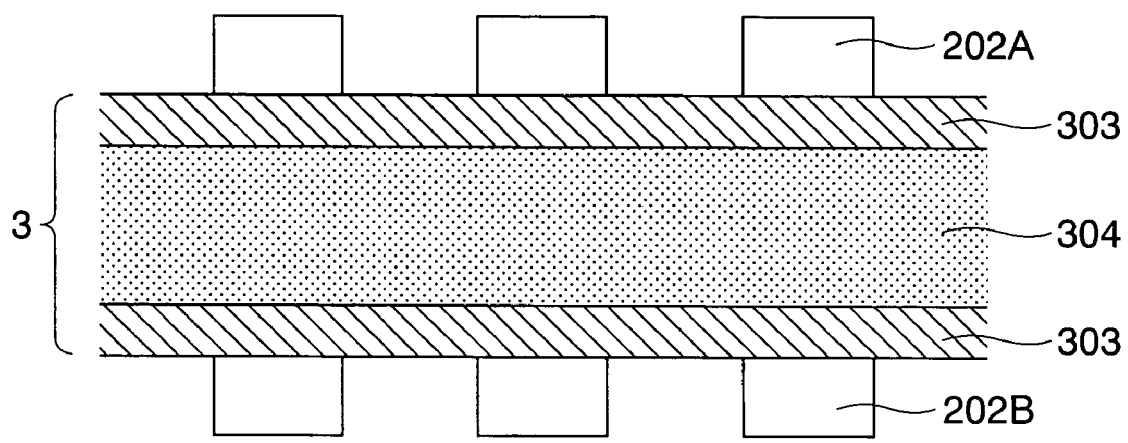
FIG. 3A is a sectional view of a coated metal plate as one example in the separator.
Figure 3B:
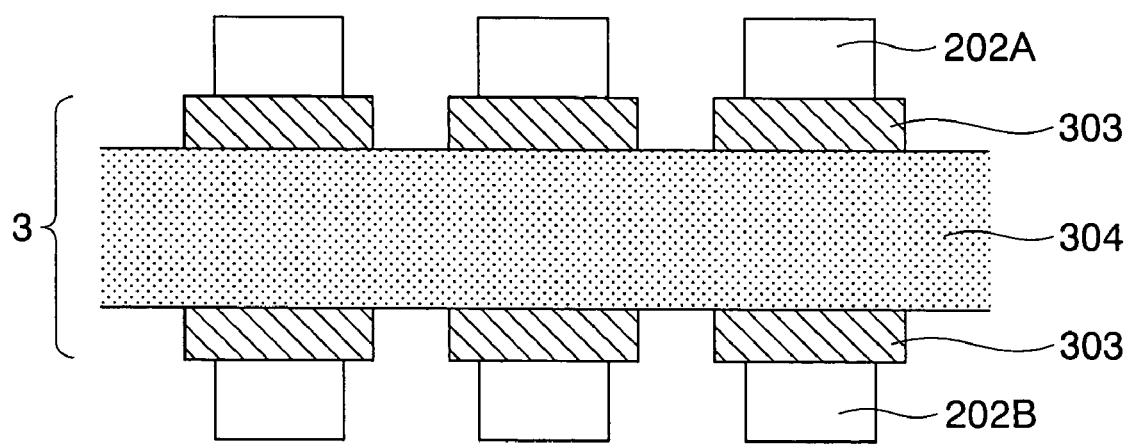
FIG. 3B is a sectional view of another example of a coated metal plate.

Each of FIGS. 3A and 3B shows a coated metallic plate 3 in a sectional view. FIG. 3A shows the coated metallic plate 3 having a coating plate 303 provided on the entire surface of a metallic substrate 304. The provision of the coating layer 303 provides an effect of suppressing the corrosion of the metallic substrate and the growth of a passivity film. A separator having a longer life can be produced at a low cost by the above-described means. As a result of several basic power-generating tests carried separately, it has been confirmed that a portion of the metallic separator which is corroded is mainly a portion through which electric current flows. More specifically, in the metallic separator, mainly interfaces contacting with the through-channels 202A and 202B shown in FIG. 3A are corroded. The corrosion of other portions has been little observed and hence, the coating layer 303 may be provided on only the portions contacting the through-channels 202A and 202B, as shown in FIG. 3B.

Figure 4:
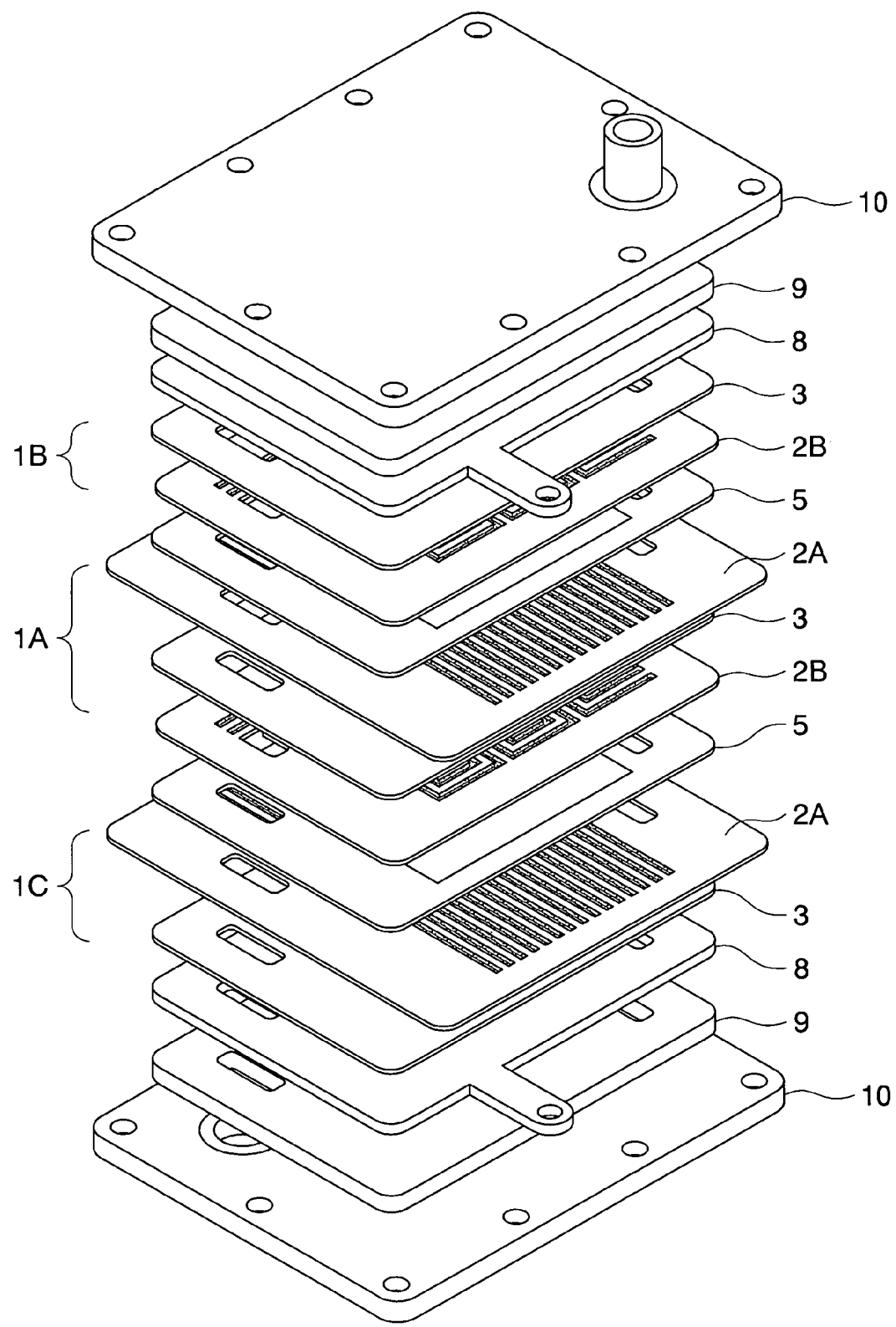
FIG. 4 is a developed perspective view showing the arrangement of a fuel cell made using the separator according to the present invention.

An example of an assembly of two fuel cells made using separators as described above is shown in FIG. 4. The separator 1A shown in FIG. 4 is the same as the separator shown in FIG. 1. Each of the separators 1B and 1C is located on the side closer to an end plate 10 and hence, a channel plate 2A or 2B permitting the passing of one of reaction gases is not required. For this reason, each of the separators is comprised of the coated metallic plate 3 and the channel plate 2B or the coated metallic plate 3 and the channel plate 2A.

An integrated MEA 5 is made by integrally bonding MEA, a gas diffusion layer and a sealing material (a gasket) on an outer periphery of the gas diffusion layer. The integrated MEA 5 is clamped by a combination of the separator 1A and the separator 1B, as well as the separator 1A and the separator 1C to provide a single power-generating cell, i.e., a power-generating unit. A collector plate 8, an insulating plate 9 and the end plate 10 are laminated in the named order on each of opposite sides of the two power-generating cells and clamped by clamping bolts or the like. In this manner, the assembly of two fuel cells is completed.

Figure 13:
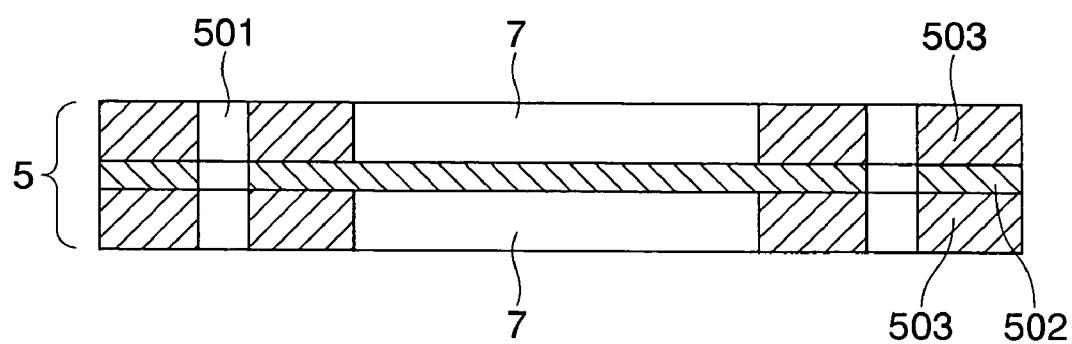
FIG. 13 is a sectional view of an integrated MEA.

The integrated MEA 5 used in this example and an example which will be described hereinafter is shown in a sectional view in FIG. 13. A gas diffusion layer 7 is disposed on each of opposite surfaces of the MEA 502 having a structure in which an electrolyte membrane and electrodes are formed integrally with each other, and a gasket 503 is bonded to an outer peripheral portion of the gas diffusion layer 7 to cover a manifold 501. Thus, the MEA 502, the gasket 503 and the gas diffusion layer 7, which are conventionally separate parts, can be integrated together, leading the an enhancement in assembling workability for the fuel cell. It should be noted that the integrated MEA 5 is used as an example in the embodiments of the present invention, but an MEA may be assembled from separate members, as is in the prior art, and even in this case, it can be used without any problem.

In the separator in this embodiment, the through-channel is rectangular and hence, not only the resistance of contact between the components in the separator but also the resistance of contact between the separator and the gas diffusion layer cannot be increased. In a case of a conventional separator made by pressing thin metallic plates, each of apexes for passing electric current has a curvature in many cases and as a result, an area of contact with the gas diffusion layer 7 is decreased. In the present invention, however, the area of contact between the gas diffusion layer 7 and each of the through-channels 202A and 202B can be increased, leading to an advantage that the contact resistance can be decreased.

Embodiment 2

Figure 5:
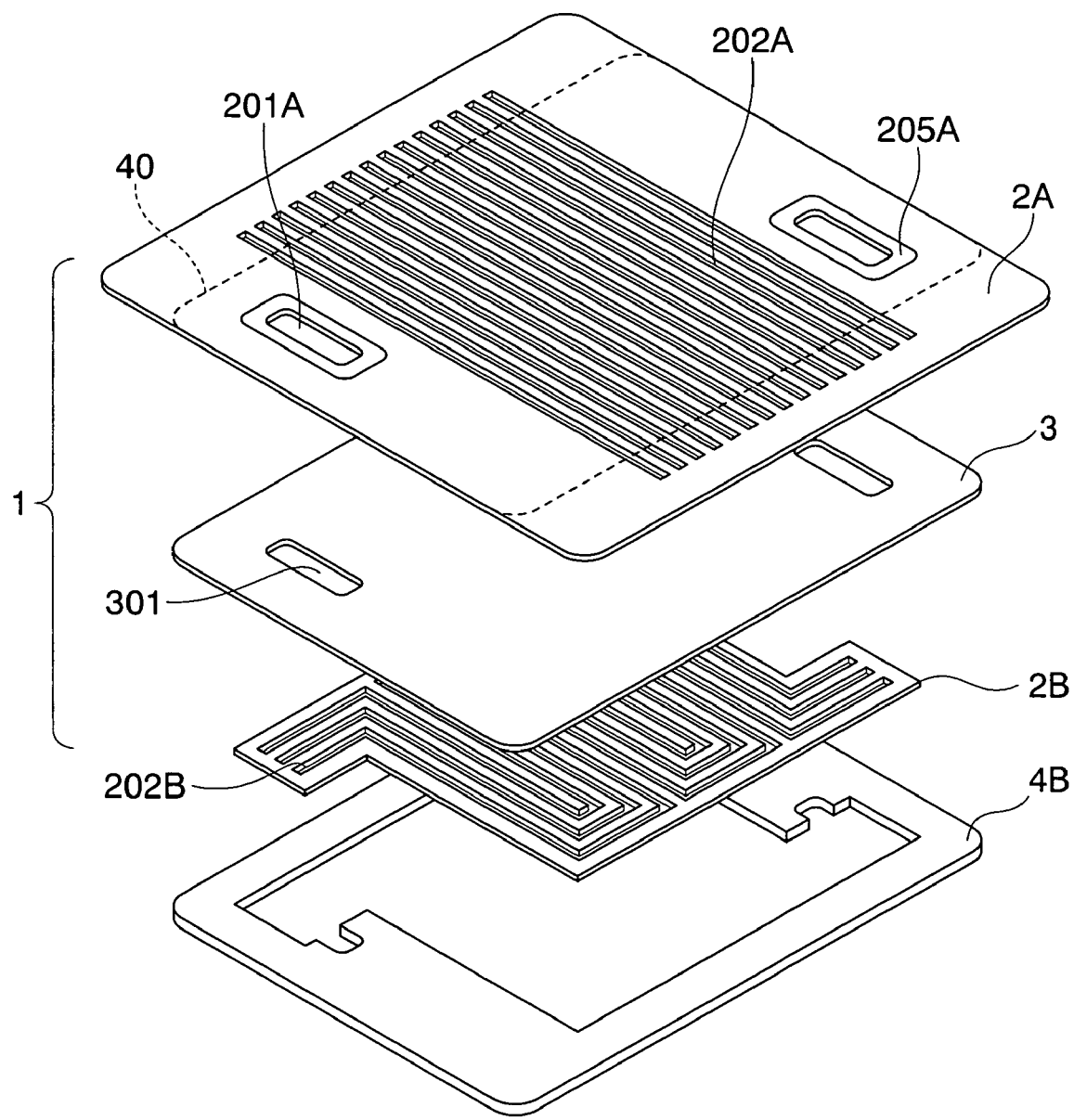
FIG. 5 is a developed perspective view of a separator using channel plates made of a porous material.

An example in which each of channel plates 2A and 2B is a porous member will be described below with reference to FIG. 5. If each of the channel plates 2A and 2B is the porous member, the amount of gas supplied to the electrode through the channel plates is increased and hence, there is an effect of increasing a generated voltage and a diffusion-limited current. FIG. 5 is a view showing a separator 1 made using channel plates 2A and 2B which are porous members. Because the channel plates 2A and 2B are the porous members, a reaction gas is freely movable in the porous member. For this reason, a single channel plate 2 as described in Embodiment 1 cannot be used.

In this embodiment, a gasket 4B is disposed around the channel plate 2B, and sealing portions 205A are provided around the manifolds 201A in the channel plate 2A. Thus, it is possible to suppress the cross leakage of the reaction gas from an anode to a cathode and from the cathode to the anode, the leakage of the reaction gas between a cooling cell and a power-generating cell, and the leakage of the reaction gas from the fuel cell body to the outside. Because the channel plate 2A is the porous member, to form the sealing portion 205A, it is desirable that a fluid containing a liquid resin or elastomer is injected under pressure into the channel plate 2A using a dispenser or a means such as a screen printing and solidified in a preselected method.

The channel plates 2A and 2B are disposed on opposite surfaces of a coated metallic plate 3 shown in FIG. 5. The coated metal plate 3 includes a coating layer provided on a surface of a metallic substrate and having a conductivity and a corrosion prevention property, and a manifold 301 for communication of the reaction gas. A plurality of through-channels for permitting the flowing of the reaction gas are formed in each of the channel plates 2A and 2B, as in the channel plate described in Embodiment 1. The channel plate 2B is formed so that a portion of the through-channel is overlapped with the manifold 301 in the coated metallic plate 3. Further, the gasket 4B cut through so that it is not overlapped with the channel plate 2B is disposed around the channel plate 2B, thereby producing one separator 1.

Figure 6A:
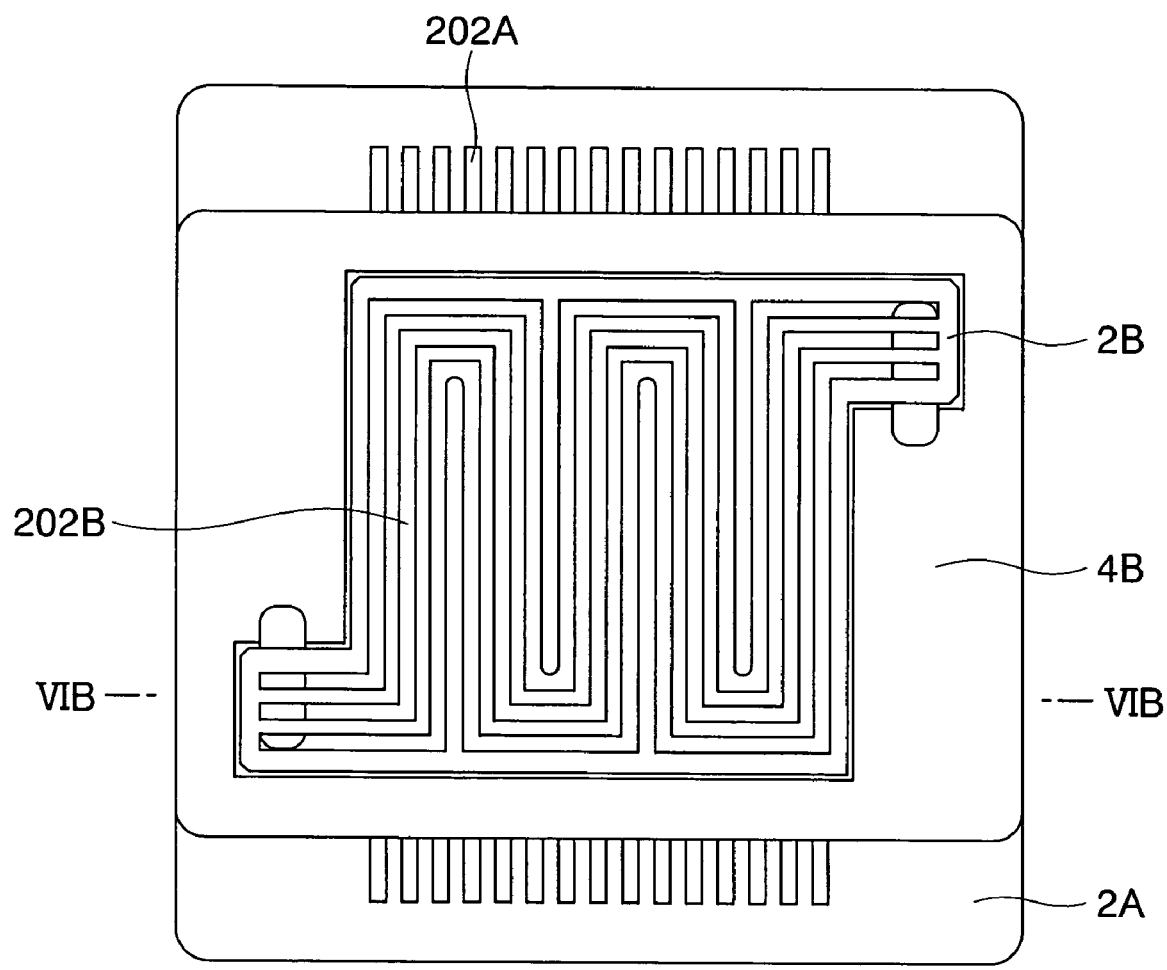
FIG. 6A is a plan view of a separator including channel plates superposed on opposite surfaces of a coated metal plate.
Figure 6B:
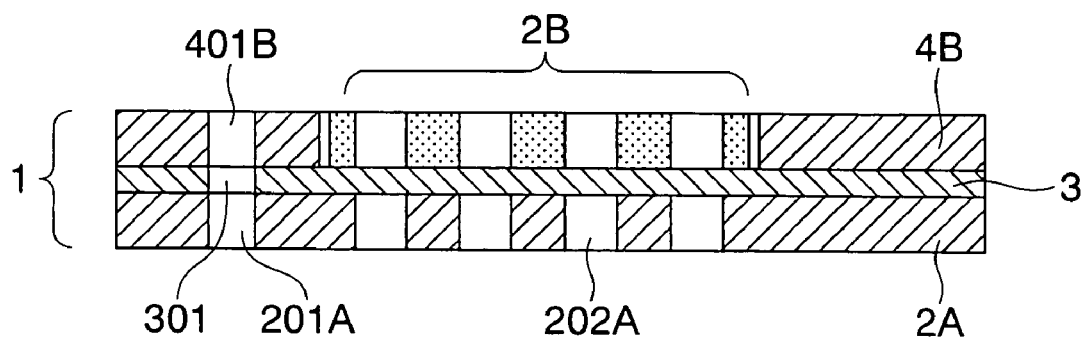
FIG. 6B is a sectional view of the separator.

FIGS. 6A and 6B show a separator in which channel plates 2A and 2B are vertically superposed on each other so that a coated metallic plate 3 is sandwiched therebetween, and further, a gasket 4B having a manifold 401B is provided. FIG. 6A shows the separator viewed from above, and FIG. 6B shows a sectional view taken along a line IVB0IVB. FIGS. 6A and 6B show a vertical positional relationship between the channel plates 2A and 2B revered from that in FIG. 5 for facilitating the understanding. The coated metallic plate 3 has the same structure as shown in FIGS. 3A and 3B. The fuel cell shown in FIG. 4 can be assembled using this separator 1.

Embodiment 3

Figure 7:
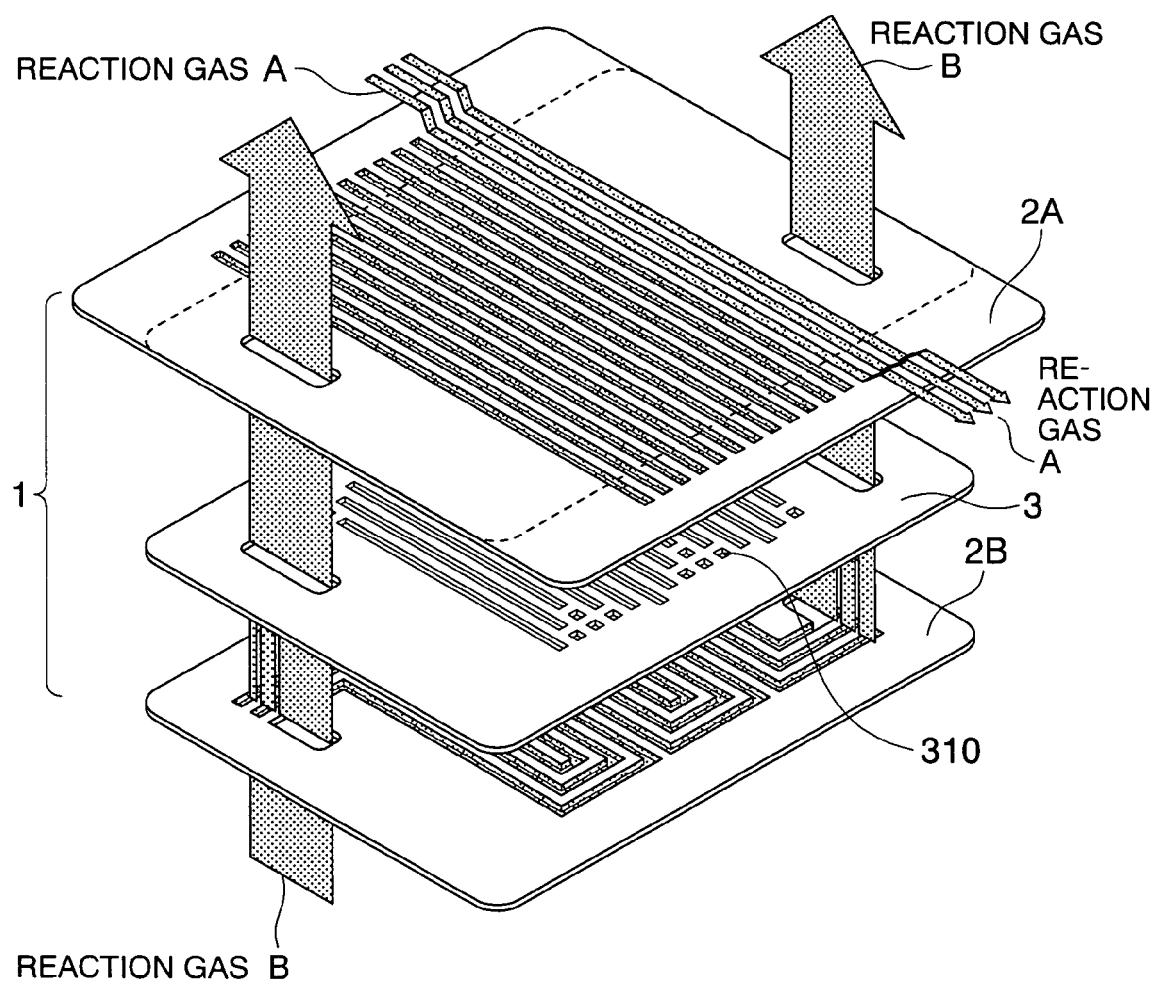
FIG. 7 is a developed perspective view of a separator including a coated metal plate provided with slits.

An example including a coated metallic plate 3 provided with slits will be described with reference to FIGS. 7 to 9. FIG. 7 shows a separator 1 including the coated metallic plate 3 provided with the slits. The basic structure of the separator is the same as that described in Embodiment 1, except that the coated metallic plate is different. The positions of the slits 310 provided in the coated metallic plate 3 are determined so that through-channels 202A and 202B in a surface corresponding to an electrode are overlapped with each other upon superposition of a channel plate 2A and a channel plate 2B on each other. Such a situation is shown in FIG. 8.

Figure 8:
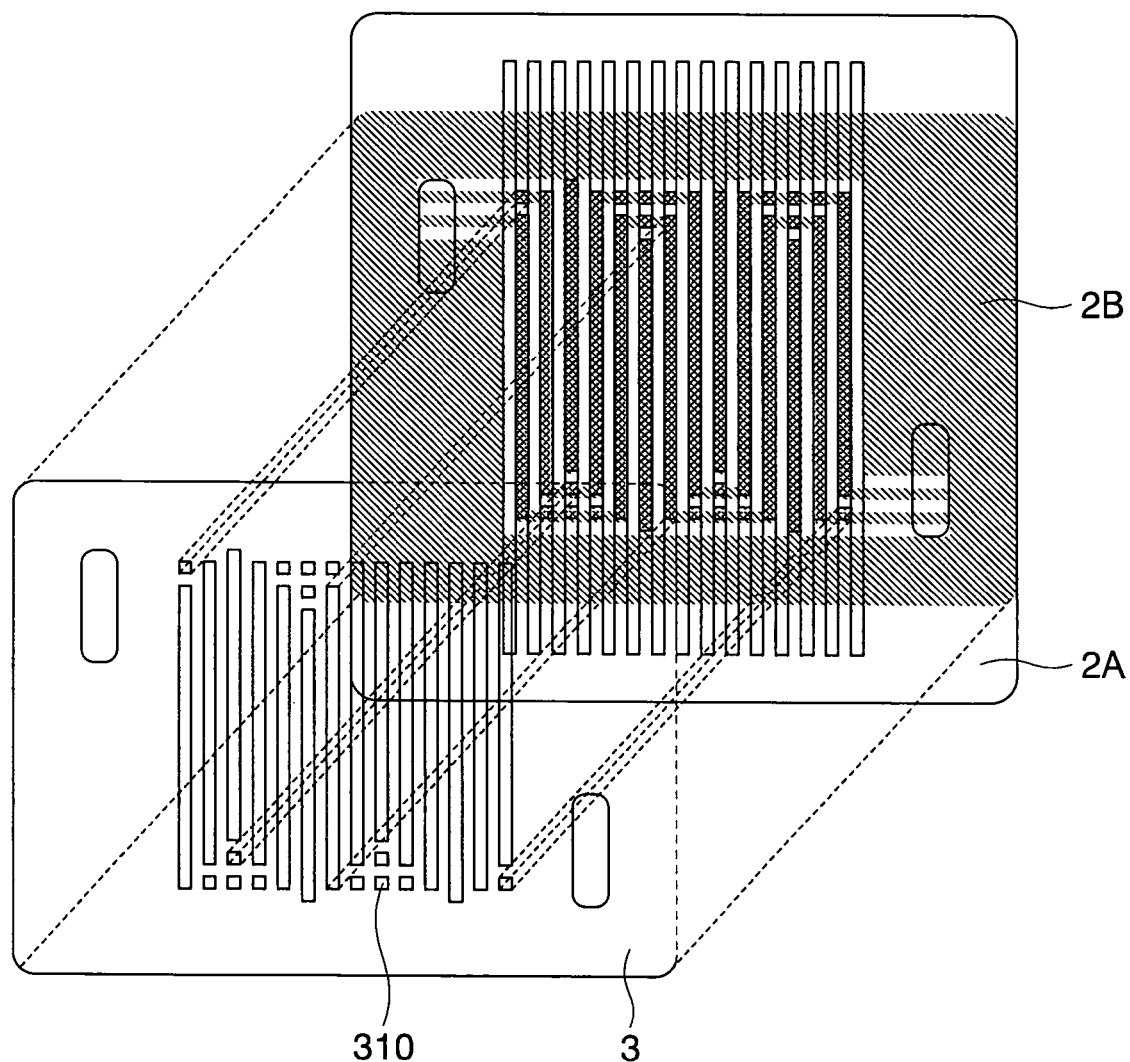
FIG. 8 is a perspective view showing the positional relationship between slits in the coated metal plate and the channel plates.

A diagram of the two channel plates 2A and 2B superposed on each other is shown at a right and upper portion of FIG. 8, and a diagram of the coated metallic plate 3 provided with the slits 310 is shown at a left and lower portion of FIG. 8. FIG. 8 is a figure for convenience of the description, and the actual positional relationship is in conformity to FIG. 7. The two channel plate shown at the right and upper portion of FIG. 8 are the channel plate 2A shown in a solid line, and the channel plate 2B shown in a hatching, wherein areas where the channel plates 2A and 2B are overlapped with each other at through-channels are shown in a dark hatching. Locations in the coated metallic plate 3, at which the slits are provided, are places corresponding the dark hatching. Some of such corresponding locations are shown in dashed lines. The size of the slits 310 provided in the coated metallic plate 3 is set to be smaller than the dark hatching, so that when the through-channels in the channel plates 2A and 2B are not dropped into the slits 310 upon piling-up of the members.

Figure 9A:
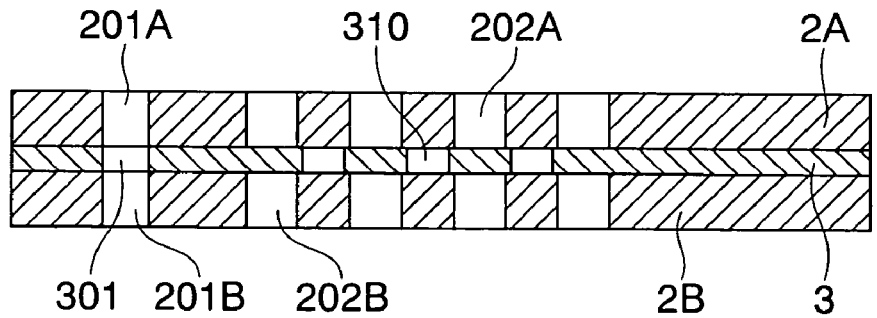
FIG. 9A is a sectional view of a separator having slits.
Figure 9B:
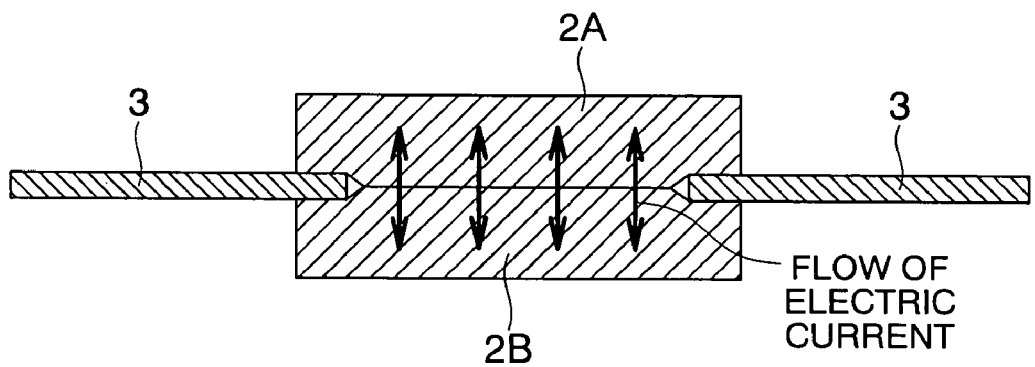
FIG. 9B is an enlarged sectional view of the separator with the slit in a depressed state.
Figure 9C:
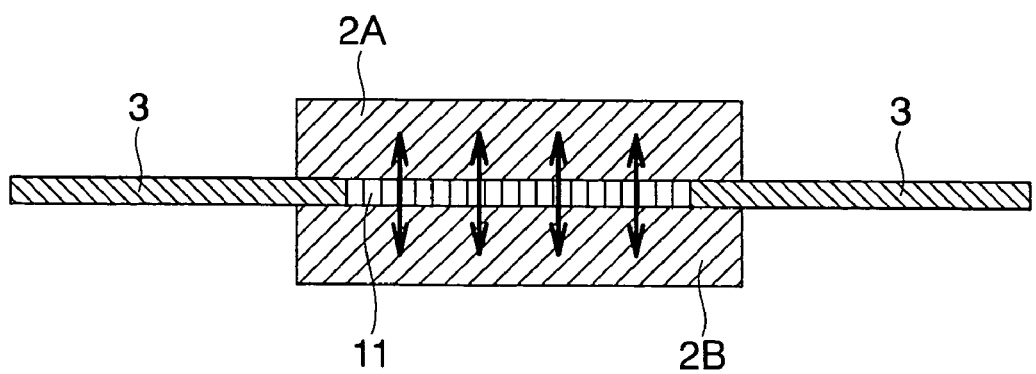
FIG. 9C is an enlarged sectional view of the separator with a filler charged in the slit.

FIGS. 9A, 9B and 9C show such a situation in a sectional view. Simply, an area where electric current flows is very small in this state, leading to a drop in voltage of a cell. However, if a material having a larger elasticity such as a carbon sheet and a carbon paper is selected as a material for the channel plates 2A and 2B, the slits are depressed upon the assembling of a cell, so that an electric conduction with the through-channels is provided. A situation of the slit depressed is shown in an enlarged manner in FIG. 9B.

As a result, the coated metallic plate 3 does not exist in a direction of flowing of electric current and hence, the corrosion-preventing coating layer 301 is not necessarily required to be provided on the coated metallic plate. In a case where a metal poor in corrosion prevention property such as aluminum is selected as a material for the coated metallic plate 3 and carbon is selected as a material for the channel plate, there is a possibility that even if a coating layer is provided on aluminum in a separator such as that in Embodiment 1 or 2, the oxide or hydroxide film of aluminum is grown in the generation of power for a long period of time, resulting in an increase in cell resistance and in a deterioration of power-generating performance. In this example, however, the coated metallic plate 3 does not exist in a passage of electric current and for this reason, even if aluminum is oxidized, the influence to the performance of the cell is smaller.

If each of the channel plates 2A and 2B is made of a hard material such as a metal, then the channel plate is not deformed and thus, the electric conduction may be not obtained. In this case, the conduction can be achieved by filling a conductive filler 11 such as a conductive coating into the slits, as shown in FIG. 9C.

By replacing the coated metallic plate 3 of the separator 1 in each of Embodiment 1 and Embodiment 2 by a coated metallic plate 3 having slits 310 as described in this example, a similar fuel cell can be formed. In addition, the coated metallic plate 3 is necessarily not required to be made of a metal. A resin or a ceramic may be used, if it has a required nature such as strength, heat resistance and water resistance. This is because the channel plates opposite each other with the coated metal plate 3 interposed therebetween are electrically connected directly to each other.

Embodiment 4

Figure 10:
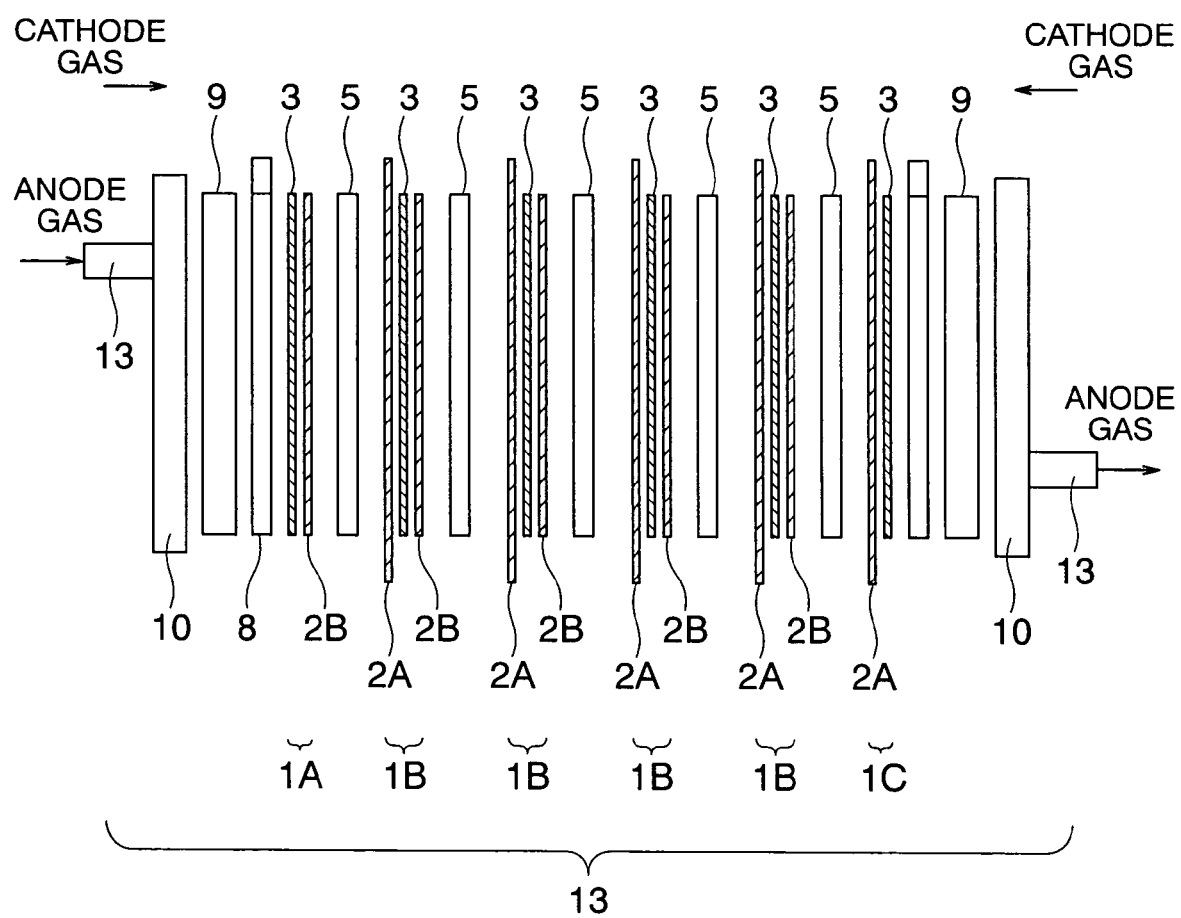
FIG. 10 is a developed view showing the order of lamination for a laminated-type fuel cell.

A laminated-type fuel cell including separators according to the present invention will be described below. FIG. 10 is an illustration of the arrangement of a fuel cell 13 made using the separators in Embodiment 1. The fuel cell 13 in this embodiment is a polymer electrolyte fuel cell of a five-cell stack type using five integrated MEA 5. Each of opposite ends of the fuel cell 13 is comprised of an end plate 10, an insulating plate 9 and a collector plate 8, with a plurality of sets of separators and integrated MEAs 5 clamped therebetween. Although not shown, the above-described members can be clamped and fixed by fastening the two end plates 10, for example, by bolts and nuts or the like. The separators are classified into three types of 1A, 1B and 1C, depending on the combination of channel plates and a coated metallic plate 3. Each of the separators 1A and 1C adjoining the end plates 10 respectively is allotted to only one of an anode reaction gas and a cathode reaction gas and hence, has a structure in which one of the channel plates does not exist. On the other hand, the separator 1B located in the middle is allotted to both of the anode reaction gas and the cathode reaction gas and hence, has a structure in which the channel plates 2A and 2B are disposed on opposite sides of the coated metallic plate 3. In FIG. 10, the separators are shown as being separated for convenience. In the fuel cell 13 in this example, the cathode reaction gas is passed through the channel plate 2A, and the anode reaction gas is passed through the channel plate 2B.

The area of an electrode for permitting the fuel cell to generate a power was set at 100 $cm^2$, and the outside dimension of each of the channel plates and the size of each of through-channels were adjusted to be suited to this value. The width of the through-channels and the width of ribs of the channel plates used on the anode side and the cathode side were set at 2 mm in pitch, and the depth of the through-channels was set at 0.4 mm. The thickness of the channel plate 2B on the anode side was set at 0.5 mm, and the thickness of the channel plate 2A on the cathode side was set at 1.0 mm. An expanded graphite sheet was used as a material for the channel plates, and the manifolds and the through-channels were formed using a Thomson-type punching machine. The metallic portion of the separator was made at a thickness of 0.1 mm and using a stainless steel (JIS SUS304). Burrs or the like produced by processing a stainless steel substrate were removed by abrading. A coating layer was provided on the entire surface of the stainless steel substrate. The coating layer was formed by applying a conductive coating material containing PVDF (polyvinylidene di-fluoride) as a binder and NMP (N-methyl-2-pyrrolidone) as a solvent to a conductive material comprising graphite and carbon black mixed together in a dipping manner, and subjecting the resulting material to a vacuum drying at a temperature of about 150° C. for 30 minutes. The concentration of the solvent was adjusted so that thickness of the conducting coating material after being finished was equal to 20 μm. The same type of MEAs 4 was used in all of the fuel cells and was a type in which commercially available gas diffusion layer and gasket were integrated to each other.

Figure 14:
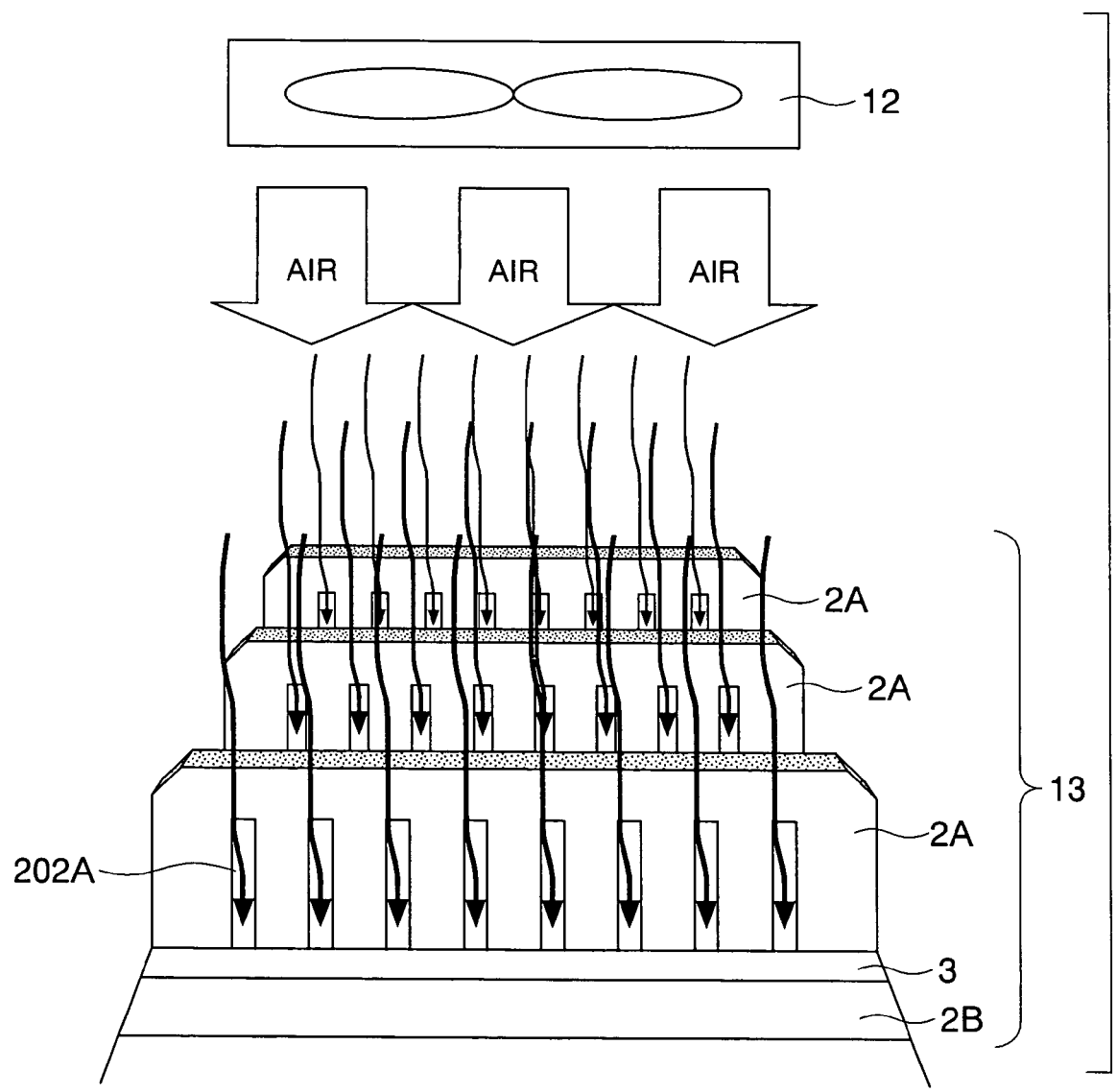
FIG. 14 is an illustration diagrammatically showing the situation of supplying of a cathode gas into a body of the fuel cell.

A power-generating test was carried out under the following conditions: The temperature of cooling water was controlled so that the temperature of the cell was equal to 70° C. Pure hydrogen was used as a fuel gas (an anode gas), and air was used as an oxidizing gas (a cathode gas). The anode gas was humidified so that a dew point in an inlet of the fuel cell was equal to 70° C. The gas was fed through connectors 13 for an outlet and an inlet provided for the anode gas in the end plates 10. The flow rate of the gas was controlled so that a hydrogen utilization rate was 80%. The air as the cathode gas was supplied from the outside of the fuel cell toward a cathode gas inlet in a body by an air blower 12 having a demand power of 5 W. At this time, a point between the air blower 12 and the cathode gas inlet in the fuel cell 13 was connected to an introducing plate, so that the cathode gas was introduced at a good efficiency into the fuel cell 13. A situation of introduction of the cathode gas into the fuel cell as viewed from the side of the end plate 10 is shown in a diagrammatic illustration in FIG. 14. The through-channels 202A in the channel plate 2A is larger than the contours of the coated metallic plate 3 and the channel plate 2B and hence, openings are formed between the through-channels 202A and the adjacent coated metallic plate 3. The cathode gas is supplied into the body of the fuel cell through the openings.

The performance of the fuel cell was evaluated by measuring an averaged cell voltage at each of current densities after generation of a power for 50 hr. At that time, the temperature of the fuel cell 13 was also measured by a thermo-couple mounted on the collector plate 8. The temperature of an atmosphere during the measurement was about 30° C. The result showed an averaged cell voltage of 730 mV and a cell temperature of 40° C. at a current density of 0.25 A/cm$^2$, and an averaged cell voltage of 610 mV and a cell temperature of 60° C. at a current density of 0.75 A/cm$^2$. In this way, the generation of a power is possible, even if a cooling cell required for a usual fuel cell is not used, and for the reason that all the separator members can be formed by on the punching structure, an effect of reduction in cost is larger.

Figure 12:
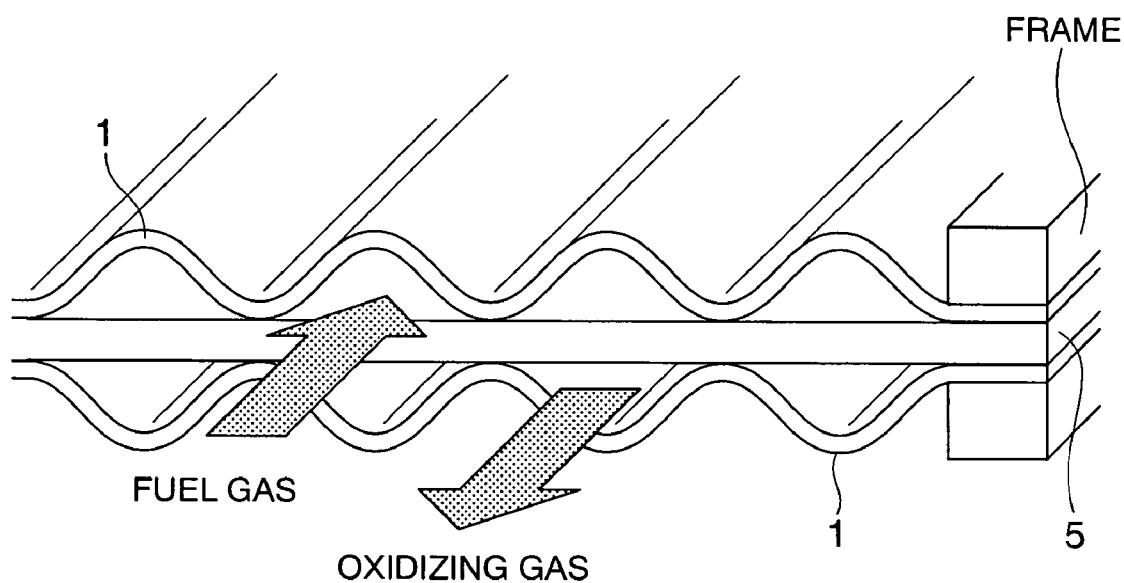
FIG. 12 is a perspective view diagrammatically showing the section of a conventional separator made by pressing of a metal.

On the contrast, a fuel cell having an arrangement similar to that of the fuel cell 13 in this example was assembled using pressed metallic separators as shown in FIG. 12 as separators, and its performance was measured. As a result, an averaged cell voltage at a current density of 0.25 A/cm$^2$ was 710 mV. This is due to the fact that each of the apexes of the pressed metallic separator had a curvature as shown in FIG. 12 and as a result, the area of contact with the integrated MEA 5 was decreased, whereby the resistance was increased. The separator according to the present invention is created by the punching and hence, its surface contacting with the integrated MEA 5 is flat and as a result, the contact resistance is smaller, and the cell voltage is higher.

The coating layer on the coated metallic plate 3 used in this example is formed from the conductive coating material, but it is not that the same effect is obtained, even if any means is used. There are various means capable of providing the coating layer 303 such as a PVD process, a plating process or a chemical conversion treatment, depending on the material for the metallic substrate 304, but means having a higher conductivity and an effect corrosion prevention property are limited. A polarization curve was measured in a 0.05M aqueous solution of sulfuric-acid having a temperature of 30° C. in order to evaluate the corrosion-preventing performance and as a result, a coating layer 303 exhibiting a highest effect was a coating layer formed by applying a conductive coating material.

In coating layers formed by other means, there is a possibility that pinholes or cracks may be produced, and unless a sound coating layer free of pinholes is formed, there is a fear that a sufficient corrosion-preventing effect is not obtained. Among the conductive coatings, coatings containing a binder selected from a fluorine-based binder, a phenol-based binder, an epoxy-based binder, a styrene-based binder, a butadiene-based binder, a polycarbonate-based binder, a polyphenylene sulfide-based binder or a mixture or copolymer of two or more of them exhibits an excellent corrosion-preventing effect, and among others, the fluorine-based PVDF exhibits a most remarkable corrosion-preventing effect.

It is required that an appropriate material is selected as a conductive material. If a coating material containing a ceramic such as tungsten carbide selected as a conductive material is used, adverse affections to the produced cell are feared, such as that the resulting coating layer 303 will be oxidized and converted into tungstic acid during generation of a power. On the other hand, if a coating material containing a carbon material such as graphite as a conductive material is used, the resulting coating layer was electrochemically stable and had a sufficient resistance even in an environment of a fuel cell. Further, a coating material containing carbon black mixed with graphite had an effect of more enhancing the electrically conductive property.

In addition, for a fuel cell used as an emergency power source or the like which does not require a long-term life and which is limited to be temporarily, channel plates 2A and 2B and a metallic substrate 304 may be arranged to be in direct contact with each other without formation of a coating layer 303.

In this embodiment, the stainless steel is used for the metal substrate of the coated metal plate 3, but the material for the metallic substrate is necessarily not limited to the stainless steel, and any other materials, if they have a certain degree of corrosion resistance, may be used. Amounts of various metal materials corroded were measured by a polarization curve and an immersion test in a 0.05 M aqueous solution of sulfuric acid or sodium sulfate at 30° C. and as a result, in addition to the stainless steel, nickel, a nickel-based alloy, titanium, a titanium-based alloy, niobium, a niobium-based alloy, tantalum, a tantalum-based alloy, tungsten, a tungsten-based alloy, zirconium and a zirconium-based alloy exhibited a particularly excellent corrosion resistance. Many of these metals less release corrosion products even if they are corroded, leading to a very small degree of influence exerted to the electrolyte and the electrodes. Therefore, it is preferable that the metallic substrate is formed of any of these metals. However, the metallic substrate 304 is necessarily not simple, and at least its surface may be formed of any of these metals. A substrate having any of these metals formed on an extremely thin surface layer for example by cladding can be employed.

On the other hand, aluminum or an aluminum alloy was corroded in sulfuric acid, but was corrosion-resistant in a neutral solution. Therefore, in the fuel cell made using the coated metallic plate 3 provided with the slits 310, even if aluminum was used for the coated metallic plate 3, the amount of aluminum corroded was smaller, because the amount of electric current passing through the aluminum was smaller. This is due to the fact that even if the aluminum is corroded, the resistance of the cell is not increased, because the aluminum does not exist in a path for flowing of electric current. It is considered to be one course that an aluminum film resembling anodized aluminum is grown in the environment of the fuel cell to suppress the corrosion. Even if a corrosion product of aluminum is released from the metallic substrate, the influence exerted to the electrodes and the electrolyte is smaller, and from this point, aluminum is also an effect metal. Iron, a low-alloy steel and copper were inappropriate, because they could not form a passivity film stable in the environment of the fuel cell.

In Embodiment 1 and Embodiment 4 described above, particularly, the coated metallic plate 3 and the channel plates are capable of constructing the fuel cell without use of a means such as bonding. Moreover, if the processing accuracy and assembling accuracy of each of the members are insufficient, then the reaction gas may overflow to the poles reverse from each other. Especially, in the separator including the coated metallic plate 3 provided with the slits 310, when the position of the channel plates is displaced from the slits, a clearance may be produced and thus, the cross leakage of the reaction gas may occur.

As a means for preventing this, it is preferable that the coated metal plate and the channel plate are previously bonded to each other. This results in an effect that the number of parts at the time of assembling is decreased and the process for assembling the fuel cell can be simplified. For the bonding of the coated metal plate 3 and the channel plate to each other, a conductive adhesive and/or a conductive coating material can be used. The conductive adhesive and the conductive coating material are applied onto one surface of each of the channel plates to be bonded to the coated metal plate 3 by a general-purpose applying means such as a spraying means, a screen-printing means and a roll coater. When the coated surfaces of the channel plates are affixed to the coated metallic plate 3 and dried under at a predetermined pressing pressure and under a drying condition, the separator is completed.

Figure 11A:
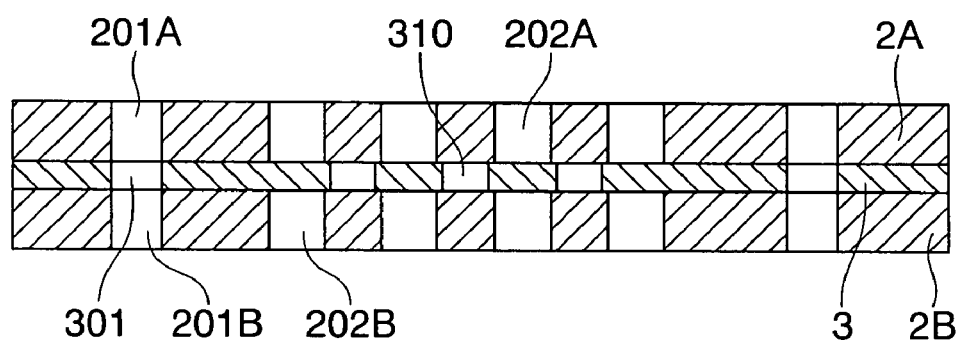
FIG. 11A is a perspective view of a separator with channel plates bonded to a coated metal plate by a conductive coating material.
Figure 11B:
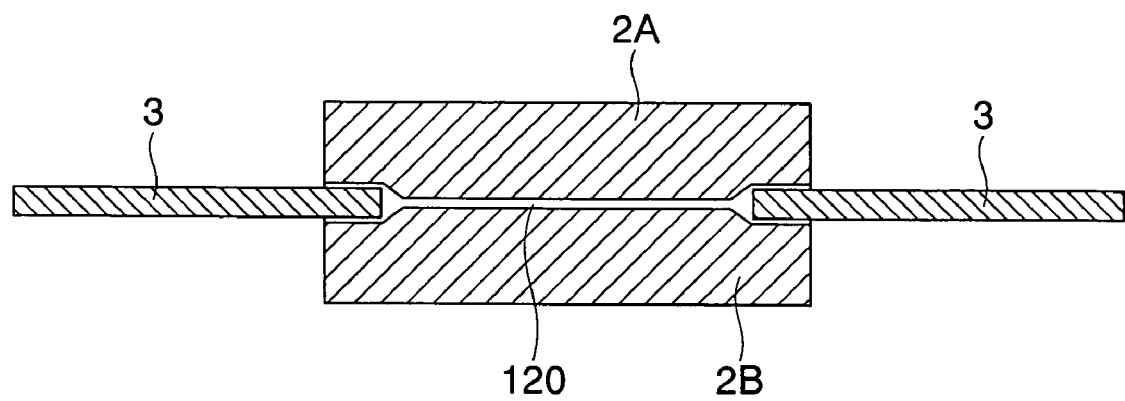
FIG. 11B is an enlarged sectional view of the separator in a partially enlarged scale.

The sectional structure produced upon bonding of the coated metallic plate 310 having the slits 310 and each of the channel plates 2A and 2B to each other using the conductive adhesive 120 is as shown in FIG. 11A. However, the conductive adhesive is omitted in FIG. 11A. FIG. 11B shows an enlarged diagram of the slit 310 in the depressed state. The conductive adhesive 120 integrally bonds the coated metallic plate 3 and each of the channel plates to each other, as well as fills the gap existing between the coated metallic plate 3 and each of the channel plates, and hence, the sealability is increased, and the cross leakage of the reaction gas is suppressed. In a case of a separator made using a coated metallic plate 3 having no slit 310, the conductive adhesive has an effect of fixing the channel plate 2. In such a case, if a conductive adhesive comprising the above-described resinous binder and the carbon conductive material is used, a corrosion-preventing property is also obtained and hence, the use of such conductive adhesive is effective. In this case, the channel plate 2 can be also bonded directly to the metallic substrate 304 without formation of a coating layer 303 on the coated metallic plate 3.

The fuel cell 13 illustrated in this example is an example of a simplest structure. Alternatively, a partition plate may be mounted between the air blower 12 and the body of the fuel cell 13 in order to supply the cathode gas into the body of the fuel cell 13 with a good efficiency. A water receiver for recovering water produced by the reaction may be provided at a side from which the cathode gas is withdrawn, and such water may be used for humidification of the anode gas. The size of the channel plate 2A is larger than the contours of the coated metal plate 3 and the channel plate 2B, and a protruding portion of the channel plate 2A functions as a cooling fin. However, when the cathode gas itself sufficiently acts as a cooling medium, or when the cooling can be achieved by a latent heat generated upon the evaporation of the produced water at the cathode, the portion of the channel plate 2A functioning as the fin may be removed after the assembling of the fuel cell, so that the channel plate 2B has the same shape as the coated metallic plate 3 and the channel plate 2B.

The polymer electrolytic fuel cell has been illustrated in each of the above-described examples, but the present invention is also applicable to a liquid fuel cell using methanol, methyl ether or the like as a reaction gas on the side of an anode.

The present invention is aimed at the simplification of the arrangement of the separator and at the facilitation of the assembling of the separator, and attributes to the propagation of the fuel cell.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A separator for a fuel cell, comprising an electrically conductive flat plate and two flat plate shaped electrically conductive channel plates superposed on each other with said electrically conductive flat plate interposed therebetween, wherein a plurality of manifolds for passing a reaction fluid to an adjacent fuel cell are formed in said electrically conductive flat plate; through-channels for permitting the flowing of the reaction fluid are formed in said two electrically conductive channel plates; any one of said two electrically conductive channel plates is disposed so as to overlap a portion of each of the through-channels with each of the plurality of the manifolds in said electrically conductive flat plate; and the other electrically conductive channel plate has a portion protruded outwardly from an outer periphery of said electrically conductive flat plate, the through-channels being formed from a region contacting with said electrically conductive flat plate to said protruded portion.

2. A separator for a fuel cell according to claim 1, wherein said electrically conductive flat plate is made of a metal, and a coating layer for preventing the corrosion of said electrically conductive flat plate or for suppressing the growth of a passivation film is provided on the whole of a surface of said electrically conductive flat plate, or at least an area of the surface of said electrically conductive flat plate, which is in contact with said through-channels.

3. A separator for a fuel cell according to claim 1, wherein one of said two electrically conductive channel plates, which is provided with the through-channels for permitting the passing of a cathode gas as a reaction gas, is formed so as to make said through-channels longer than the contour of said electrically conductive flat plate.

4. A separator for a fuel cell according to claim 1, wherein one of said two electrically conductive channel plates, which is provided with the through-channels through which fuel as a reaction gas flows, is formed so as to overlap a portion of each of said through-channels with each of the plurality of the manifolds in said electrically conductive flat plate.

5. A separator for a fuel cell according to claim 1, wherein both of said two electrically conductive channel plates are formed of a porous material.

6. A separator for a fuel cell according to claim 5, further comprising a gasket provided to surround at least one of said two electrically conductive channel plate provided with the through-channels through which the fuel as said reaction gas flows.

7. A separator for a fuel cell according to claim 6, further comprising sealing portions provided in each of the plurality of the manifolds in at least one of said two electrically conductive channel plate having the through-channels through which the cathode gas as said reaction gas flows.

8. A separator for a fuel cell according to claim 6, wherein said electrically conductive channel plate provided with said gasket is smaller than the contour of said electrically conductive flat plate, and the size of said electrically conductive channel plate when being combined with said gasket is equal or substantially equal to the contour of said electrically conductive flat plate.

9. A separator for a fuel cell according to claim 1, wherein said electrically conductive flat plate is partially provided with slits, the positions of which are at such a portion that when said two electrically conductive channel plates are superposed on opposite sides of said electrically conductive flat plates, the through-channels in one of said electrically conductive channel plates are overlapped with the through-channels in the other electrically conductive channel plate.

10. A separator for a fuel cell according to claim 1, wherein the whole of a surface of said electrically conductive flat plate, or at least an area of the surface of said electrically conductive flat plate, which is in contact with said through-channels, is formed of a metal selected from the group consisting of a stainless steel, nickel, a nickel-based alloy, titanium, a titanium-based alloy, niobium, a niobium-based alloy, tantalum, a tantalum-based alloy, tungsten, a tungsten-based alloy, zirconium, a zirconium-based alloy, aluminum and an aluminum-based alloy.

11. A separator for a fuel cell according to claim 2, wherein the whole of a surface of said electrically conductive flat plate, or at least an area of the surface of said electrically conductive flat plate, which is in contact with said through-channels, has the coating layer which is formed of a binder containing a resin selected from a fluorine-based resin, a phenol-based resin, an epoxy-based resin, a styrene-based resin, a butadiene-based resin, a polycarbonate-based resin, a polyphenylene sulfide-based resin, or a mixture or a copolymer of two or more of them, and one or more types of carbon-containing conductive materials.

12. A separator for a fuel cell according to claim 2, wherein the electrically conductive flat plate having said coating layer and at least one of said two electrically conductive channel plates are formed integrally with each other.

13. A fuel cell comprising a separator according to claim 1.

14. A fuel cell comprising a fuel cell stack constructed by laminating power-generating units which includes an electrolyte or electrode integrated structure formed of an electrolyte and electrodes integrated together, a pair of gas diffusion layers disposed on opposite surfaces of said electrolyte or electrode integrated structure, and a pair of separators disposed outside said gas diffusion layers; electric collector plates disposed outside said fuel cell stack; and end plates disposed outside said collector plates, wherein the separator disposed between the plurality of power-generating units is comprised of an electrically conductive flat plate, and two flat plate shaped electrically conductive channel plates superposed on each other with said electrically conductive flat plate interposed therebetween; a plurality of manifolds for passing a reaction fluid to an adjacent cell are formed in said electrically conductive flat plate; through-channels for permitting the flowing the reaction fluid from each of said plurality of manifolds are formed in said two electrically conductive channel plates; any one of said two electrically conductive channel plates is formed so that the through-channels are partially overlapped with each of said plurality of said manifolds in said electrically conductive flat plate; and and the other electrically conductive channel plate has a portion protruded outwardly from an outer periphery of said electrically conductive flat plate, the through-channels being formed from a region contacting with said electrically conductive flat plate to said protruded portion.

15. A fuel cell according to claim 14, wherein said electrolyte or electrode integrated structure and said gas diffusion layers are formed integrally with each other.

* * * * *